United States Patent
Hartley et al.

(10) Patent No.: US 8,126,824 B2
(45) Date of Patent: *Feb. 28, 2012

(54) ADVANCED DATA INTEGRITY

(75) Inventors: Michael Scott Hartley, Atlanta, GA (US); Leana Rachelle Wallace, San Francisco, CA (US); Lisa Marie Henning, Denver, CO (US); Nicholas Francisco Howell, San Marino, CA (US); Sanjay Mathur, Redwood City, CA (US)

(73) Assignee: Accenture Global Services Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 12/966,978

(22) Filed: Dec. 13, 2010

(65) Prior Publication Data

US 2011/0173151 A1 Jul. 14, 2011

Related U.S. Application Data

(63) Continuation of application No. 11/070,739, filed on Mar. 2, 2005, now Pat. No. 7,860,812.

(51) Int. Cl.
*G06F 17/00* (2006.01)
(52) U.S. Cl. .......................... 706/12; 713/186
(58) Field of Classification Search ............ 706/12; 713/186
See application file for complete search history.

(56) References Cited

U.S. PATENT DOCUMENTS

| | | | |
|---|---|---|---|
| 5,486,999 A * | 1/1996 | Mebane | 705/2 |
| 5,819,226 A * | 10/1998 | Gopinathan et al. | 705/44 |
| 5,822,741 A * | 10/1998 | Fischthal | 706/16 |
| 6,157,921 A * | 12/2000 | Barnhill | 706/16 |
| 6,347,310 B1 * | 2/2002 | Passera | 706/25 |
| 6,826,536 B1 * | 11/2004 | Forman | 705/4 |
| 7,194,416 B1 * | 3/2007 | Provost et al. | 705/4 |
| 7,263,492 B1 * | 8/2007 | Suresh et al. | 705/2 |
| 7,376,573 B1 * | 5/2008 | Costonis et al. | 705/4 |
| 7,392,201 B1 * | 6/2008 | Binns et al. | 705/4 |
| 2003/0135397 A1 * | 7/2003 | Halow et al. | 705/4 |
| 2005/0027664 A1 * | 2/2005 | Johnson et al. | 706/12 |
| 2005/0043972 A1 * | 2/2005 | Kossol et al. | 705/4 |
| 2005/0049990 A1 * | 3/2005 | Milenova et al. | 706/48 |
| 2007/0038479 A1 * | 2/2007 | Kay | 705/4 |

* cited by examiner

*Primary Examiner* — Jeffrey A Gaffin
*Assistant Examiner* — David H Kim
(74) *Attorney, Agent, or Firm* — Mannava & Kang P.C.

(57) ABSTRACT

A payment integrity system that processes data, including data associated with a biometric technology. The system includes a discovery module to receive insurance records from a source of data, which includes the data associated with the biometric technology, the records providing information that pertain to at least one transaction. The discovery module includes a query component and an artificial intelligence engine to process the records to identify a second subset of the records having anomalous information, and provide a second analysis output indicative of the second subset. The system also includes an audit module to determine whether to instruct the artificial intelligence engine to analyze the records according to the outputs. The system facilitates resolution of a claim payment based on the first analysis output and the second analysis output.

20 Claims, 8 Drawing Sheets

ADVANCED DATA INTEGRITY

CLAIM OF PRIORITY

The present application claims the benefit of priority to U.S. patent application Ser. No. 11/070,739, filed on Mar. 2, 2005, entitled Advanced Payment Integrity, by Michael Scott Harley et al., the disclosure of which is hereby incorporated by reference in its entirety.

BACKGROUND

Healthcare claims payers are susceptible to fraud, abuse and errors due to the complex rules, regulations, and calculations applied in the payment process and data integrity issues that are common in payer systems. Credible estimates of the overall amount of losses in health care payments processes range from 5% to 15% of the total reimbursements. Because the amount of reimbursement is greater than a trillion dollars per year in the United States, the losses translate to many billions of dollars per year.

Current healthcare claims payer processes for ensuring payment integrity are often manually intensive and ineffective. Typically, an auditing specialist investigates data records related to a claim, resolves the claim, and issues a payment or requests a refund from the associated party. Significant overpayments and underpayments are not identified due to low use of sophisticated analytical techniques. The payer processes currently in place are not optimized for efficiency, which inhibits the ability of claims payers to dedicate sufficient headcount to manage payment integrity given budget constraints. An array of niche vendors serve the healthcare claims payer market supporting limited services to help manage the problem but do not provide integrated and sophisticated solutions to the root causes of payment integrity problems. Consequently, the above-mentioned inefficiencies result in additional costs in administering an insurance program. Ultimately, individuals paying insurance premiums must bear the costs. Moreover, current approaches are typically focused on post-payment recovery as opposed to pre-payment prevention. Post-payment recoveries are on average only recouped 75% of the time, and are administratively costly to process when compared to pre-payment prevention.

However, systems and methods that assist healthcare claims payers in identifying and resolving payment integrity issues are lacking in payment integrity.

BRIEF SUMMARY OF THE INVENTION

Disclosed herein are payment integrity systems that support a payment process with service providers and clients. More particularly, the embodiments provides methods and systems for identifying and resolving payment integrity issues.

The methods and systems are identifying and resolving payment integrity issues. Among other advantages, the disclosed methods and systems enhance the efficiency of a payment integrity system for insurance claims that include health care services.

In a first embodiment, there is a payment integrity system that processes data, including data associated with a biometric technology. The system includes a discovery module to receive insurance records from a source of data which includes the data associated with the biometric technology. The records provide information that pertain to at least one transaction. The discovery module includes a query component, implemented by a processor, to query the source of data to identify a first subset of the records that satisfy a selection criterion. The query component provides a first analysis output indicative of the first subset. The discovery module also includes and an artificial intelligence engine, implemented by the processor, to process the records to identify a second subset of the records having anomalous information. The artificial intelligence engine provides a second analysis output indicative of the second subset. The system also includes an audit module to receive and analyze the first analysis output. The audit module determines whether to instruct the artificial intelligence engine to analyze the records in accordance with the first analysis output. The audit module does this in response to the determination to instruct the artificial intelligence engine to analyze the records in accordance with the first analysis output and then instructs the artificial intelligence engine to analyze the records in accordance with the first analysis output. The system facilitates resolution of a claim payment based on the first analysis output and the second analysis output.

In a second embodiment, there is a method including querying, by a query component implemented by a processor, a data source, which includes data associated with a biometric technology, based on a selection criterion for insurance records that provide information pertaining to at least one transaction. The method also includes identifying a first subset of the records that satisfy a selection criterion and generating, by the processor, a first analysis output indicative of the first subset. The method also includes receiving the first analysis output by an audit module and determining whether to instruct an artificial intelligence engine to analyze the records in accordance with the first analysis output. In the method, the audit module, in response to the determination to instruct the artificial intelligence engine to analyze the records in accordance with the first analysis output, the audit module then instructs the artificial intelligence engine to analyze the records in accordance with the first analysis output. The method also includes processing the records, by the artificial intelligence engine, to identify a second subset of the records having anomalous information. The method also includes providing a second analysis output indicative of the second subset. In the method the audit module provides an audit output based on the first analysis output and the second analysis output.

In a third embodiment there is a non-transitory computer readable medium storing computer readable instructions that when executed by a computer system perform a method. The method includes querying, by a query component implemented by a processor, a data source, which includes data associated with a biometric technology, based on a selection criterion for insurance records that provide information pertaining to at least one transaction. The method also includes identifying a first subset of the records that satisfy a selection criterion and generating, by the processor, a first analysis output indicative of the first subset. The method also includes receiving the first analysis output by an audit module and determining whether to instruct an artificial intelligence engine to analyze the records in accordance with the first analysis output. In the method, the audit module, in response to the determination to instruct the artificial intelligence engine to analyze the records in accordance with the first analysis output, the audit module then instructs the artificial intelligence engine to analyze the records in accordance with the first analysis output. The method also includes processing the records, by the artificial intelligence engine, to identify a second subset of the records having anomalous information. The method also includes providing a second analysis output indicative of the second subset. In the method the audit module provides an audit output based on the first analysis output and the second analysis output.

One aspect is a plurality of analytic techniques is integrated in a payment integrity system. Various underlying analytic methods are used in the components and modules including, but not limited to: machine learning technologies such as text mining, data mining, neural networks or natural language processing; optimization technologies such as genetic algorithms and swarm algorithms; and modeling, simulation and forecasting technologies like agent-based modeling, and discrete event simulation. With an embodiment, a discovery module includes a query component, an artificial intelligence engine, and a machine learning component. Embodiments may support different types of machine learning components, including a text mining component, a data mining component, a neural network, or a natural language processor. One or more of the analysis components provide information from a source transaction system to an audit module. The audit module utilizes the outputs from the analysis components to resolve a potentially inappropriate payment. With a variation of the embodiment, the audit module instructs one of the analysis components to further analyze information from the source transaction system in accordance with previously provided information from another analysis component.

In another aspect is an audit module which determines an error in an insurance claim. The audit module instructs an artificial intelligence engine, which uses the appropriate and relevant underlying analytic method, to retrieve data records for other claims that may have a similar error. The audit module audits the retrieved data records. In an embodiment, the audit module determines a list of known members who have other insurance coverage and instructs an artificial intelligence engine to provide data records of other members who may have other insurance coverage, applying appropriate analytic methods such as the artificial intelligence capabilities of pattern recognition or machine learning techniques such as text mining.

In another aspect, the audit module of a payment integrity system informs a primary transaction system of an error type so that the primary transaction system may take corrective action for subsequent transactions.

In another aspect, an audit module of a payment integrity system determines a productivity measure and/or a quality measurement for an auditor.

In another aspect, the recovery and adjustments module processes the results of the audit module to request and process repayments in the case of overpayments or to process adjustments and further payment in the case of underpayments.

Another aspect is a recovery and adjustments module of a payment integrity system determines a productivity measure and/or a quality measurement for a recovery and adjustments processor.

Another aspect is a results tracking module reports and tracks outstanding payments and reports completed payments and recoveries.

Another aspect is a payment integrity system receives an indication of a provider claim dispute and automatically resolves the dispute if audit rules are applicable and notifies an auditing specialist if the rules are not applicable. The audit module instructs a discovery module to access data for corresponding claims having a similar characteristic for further auditing in the audit module.

With another aspect, a recovery and adjustment module of a payment integrity system receives a notification of an unsolicited repayment from a provider, applies the repayment to the associated claim, and instructs a discovery module to access data for additional claims having a similar characteristic. An audit module audits the additional claims.

BRIEF DESCRIPTION OF THE DRAWINGS

Embodiments are described in detail in the following description with reference to the following figures. The embodiments are illustrated by way of example and are not limited in the accompanying figures in which like reference numerals indicate similar elements.

DETAILED DESCRIPTION OF THE EMBODIMENTS

For simplicity and illustrative purposes, the principles of the embodiments are described by referring mainly to examples thereof. In the following description, numerous specific details are set forth in order to provide a thorough understanding of the embodiments. It is apparent however, to one of ordinary skill in the art, that the embodiments may be practiced without limitation to these specific details. In some instances, well known methods and structures have not been described in detail so as not to unnecessarily obscure the embodiments. Furthermore, different embodiments are described below. The embodiments may be used or performed together in different combinations.

In the description, the term claim is clarified to denote a demand for payment which is due one, e.g., an insurance claim.

Figure 1:
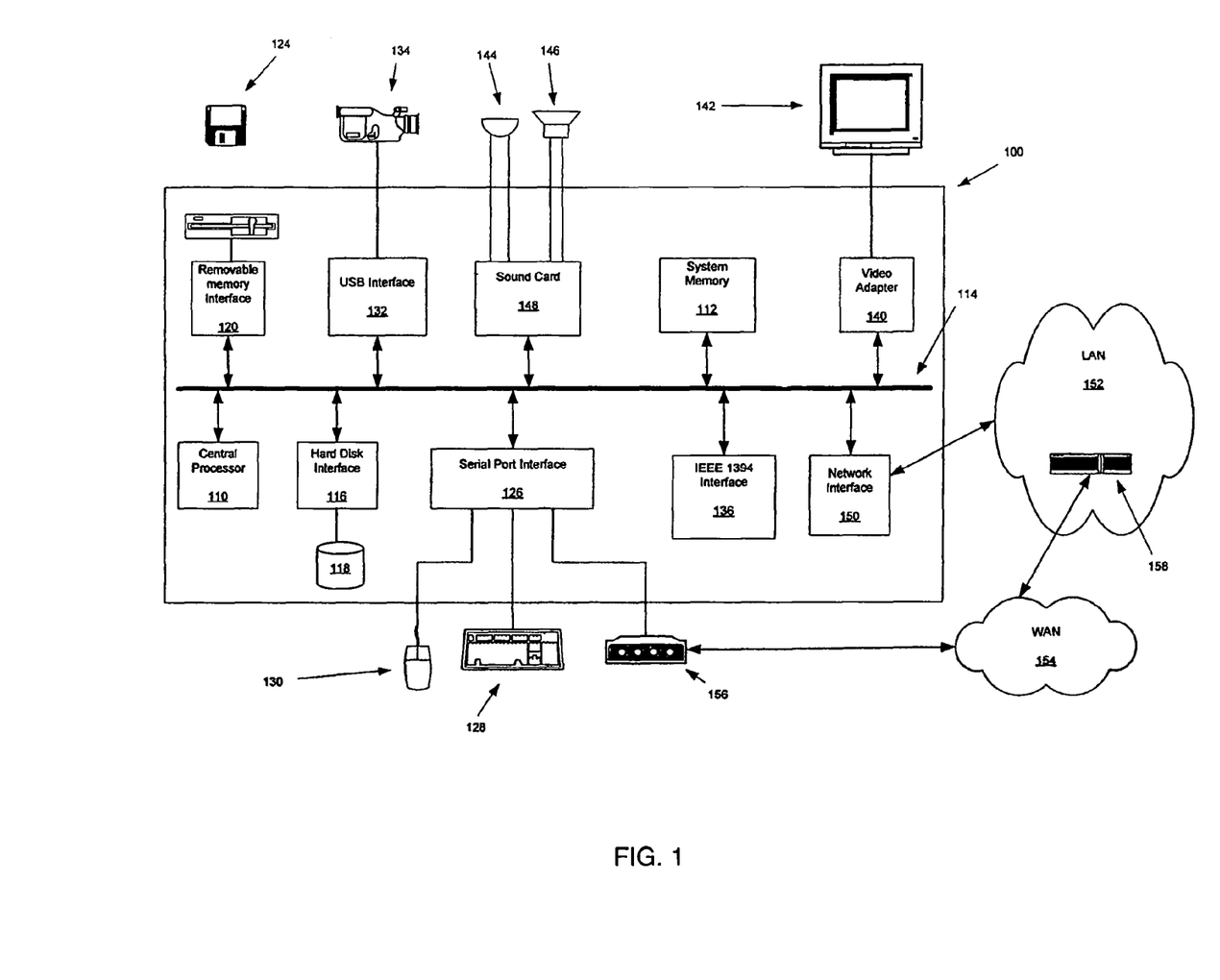
FIG. 1 shows an architecture of a computer system used in an advanced payment integrity system in accordance with an embodiment.

Elements of the present invention may be implemented with computer systems, such as the system 100 shown in FIG. 1. Computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media.

A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may configured to operate with particular manufacture interfaces such as FIREWIRE and ILINK. Input devices may also be coupled to system bus 114 through a parallel port, a game port, a PCI board or any other interface used to couple and input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 166. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, etc., that perform particular tasks or implement particular abstract data types. The embodiments may also be practiced with other computer system configurations, including hand-held devices, multiprocessor systems, microprocessor-based or programmable consumer electronics, network PCS, minicomputers, mainframe computers, personal digital assistants and the like. Furthermore, they may also be practiced in distributed computing environments where tasks are performed by remote processing devices that are linked through a communications network. In a distributed computing environment, program modules may be located in both local and remote memory storage devices.

Figure 2:
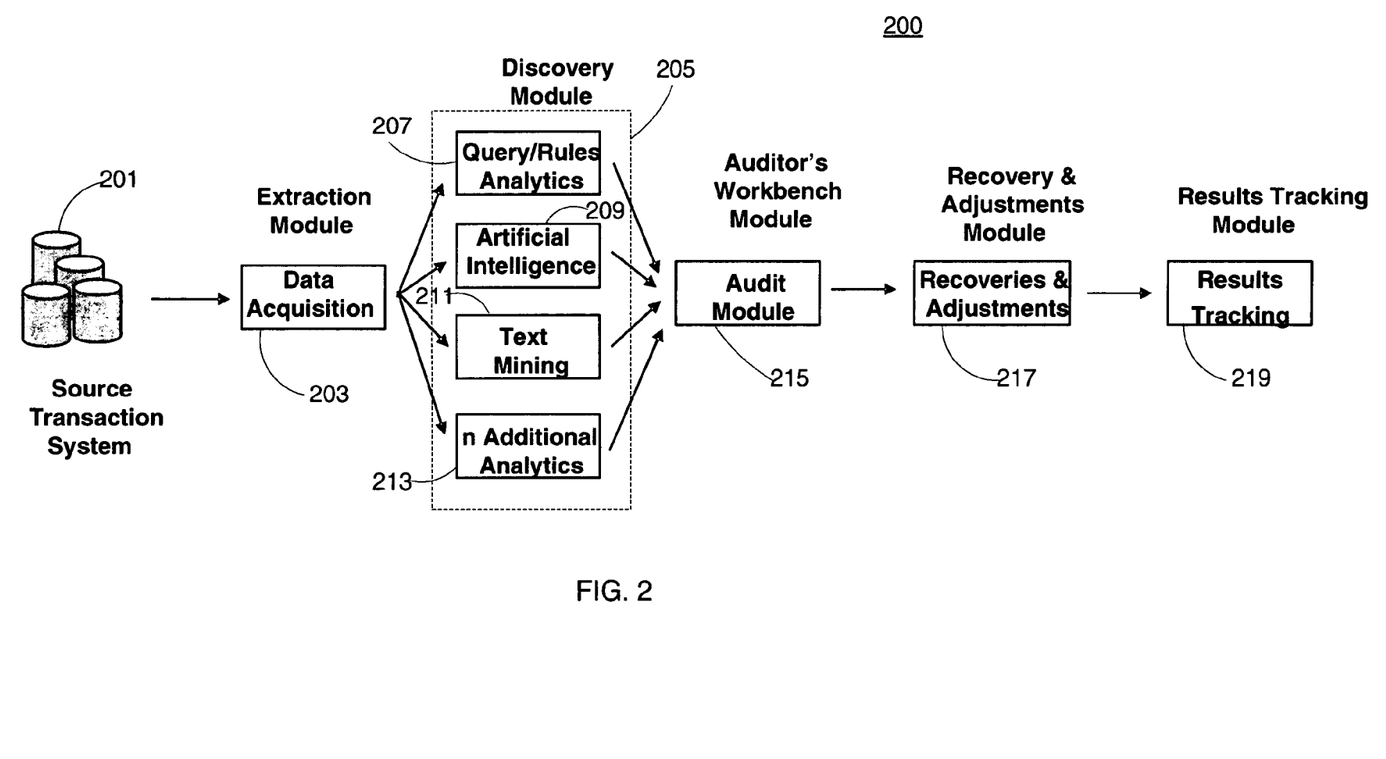
FIG. 2 shows an architecture of an advanced payment integrity system in accordance with an embodiment.

FIG. 2 shows an architecture of advanced payment integrity system 200 in accordance with an embodiment. Advanced payment integrity system 200 may support transactions for medical insurance claims, royalty payments, life insurance claims, property causality claims, and so forth. For example, advanced payment integrity system 200 may support administrative insurance operations for health insurance, home owners insurance, third party liability, and workers compensation. Payment integrity system 200 comprises source transaction system 201, extraction module 203, discovery module 205, audit module 215, recovery and adjustments module 217, and results tracking module 219. Source transaction system 201 stores data records, text information, and other data in at least one data structure. Extraction module extracts, translates, and routes data from source transaction system 201 to discovery module 205. Advanced payment integrity system 200 performs end to end processing from discovery (corresponding to discovery module 205) through audit (corresponding to audit module 215) through recovery or adjustment (corresponding to recovery and adjustments module 217) to results tracking (corresponding to results tracking module 219). Advanced payment integrity system 200 may identify both unintentional errors as well as potential fraud and abuse. Advanced payment integrity system 200 may proactively process claim payments in order to identify payment errors. Advanced payment integrity system 200 may reactively resolve inbound disputes and voluntary refunds and then identify other claim payments that may have a similar error. Also, advanced payment integrity system 200 drives efficiency, automation, and higher performance by associating claim payments into large blocks of claim payments. Advanced payment integrity system 200 supports cost containment, auditing, dispute management, and recovery processes that may be automated as well as manual and that are consistently executed.

Discovery module 205 supports one or more of the analytic components. In the embodiment shown in FIG. 1, discovery module 205 comprises query/rules component 207, artificial intelligence (AI) engine 209, and text mining component 211. The embodiment may also support other analytical components 213. For example, other analytical components may include a payee identification component that verifies the identification of the payee through registered characteristics, e.g., with fingerprint and iris images using biometric technology. Other analytical components include machine learning technologies such as text mining, data mining, neural networks or natural language processing; optimization technologies such as genetic algorithms and swarm algorithms; and modeling, simulation and forecasting technologies like agent-based modeling, and discrete event simulation. Other analytical components may be incorporated with some or all of components 207, 209, and 211. For example, artificial intelligence engine 209 may utilize machine learning technologies, optimization technologies, and/or modeling, simulation, and forecasting technologies.

Machine learning technologies include text mining, data mining, neural networks and natural language processing. These technologies can all be used to let our system more quickly understand unstructured data, identify and delineate interesting segmentations, groupings and patterns in the data and help to further human understanding and interpretation of large sets of data. Machine learning technologies rely not only on advanced statistical methods like linear and non-linear regression techniques, but also upon non-statistical methods like decision trees and neural networks.

Optimization technologies include genetic algorithms, evolutionary computing and swarm algorithms/optimizations. Optimization technologies may be used to let our system determine what claims might yield the best results, or potentially determine how to assign claims to a claim auditor. Most optimization technologies mimic the way large populations solve problems over a long period of time.

Modeling, simulation and forecasting technologies include agent-based modeling, discrete event simulation and finite element analysis. These technologies may be used to help identify new patters for overpayment (or fraud), or expected volumes of a certain type of overpayment scenario to assist in targeting. Agent-based models attempt to simulate various complex phenomena by the use of virtual agents that represent the different components of a business system. Each agent is programmed with simple rules including parameters of the model that represent the situation of interest. Each model may execute for thousands of iterations to find the best prediction.

Query/rules component 207 performs a series of queries of source transaction system 201 based upon a specific selection criteria. For example, an auditing specialist may run a query in which paid claims are retrieved where the dates of service are after the termination date of insurance coverage if the auditing specialist is interested in determining overpayments caused by retroactive termination of coverage. In addition, artificial intelligence engine 209 utilizes a variety of analytic technologies and techniques (but does not specify specific conditions) to search for data records to determine data records that appear to be anomalous. Using machine learning techniques, text mining component 211 searches for unstructured data that matches a specified text string in text data or is sufficiently similar to warrant review as potential error payments.

Audit module 215 utilizes data provided by discovery module 205 to audit a claim payment. A claim payment may be initiated by a service provider or by a member who receives healthcare service. The embodiment supports both pre-payment audits as well as post-payment audits to enhance first time accuracy and continuous improvement. Additionally, audit module 215 supports the identification and resolution of both overpayments and underpayments. Audit module 215 organizes and manages the workflow of payments that may be reviewed through a manual audit by an auditing specialist. Moreover, audit module 215 may automatically audit a claim payment or partially audit a claim payment if established audit rules are applicable to the claim payment. Audit module 215 provides a workflow solution (using work management techniques) to create an efficient process for conducting necessary reviews of potential error payments. Audit module 215 supports current standard claim payments quality audits as well as cost containment or dispute driven audits.

In the embodiment, query/rules component 207 may also support a random auditing process. Query/rules component 207 randomly selects a record from an accessed set of records from source transaction system 201. Audit module 215 consequently audits the corresponding claim.

Advanced payment integrity system 200 may combine the results of a plurality of analytical components in order to support an audit process by audit module 215. Advanced payment integrity system 200 may combine multiple methods of advanced analytical techniques to enhance potential error claim payment detection with workflow and rules engine-optimized processing capabilities to audit and adjust claim payments that are determined to contain errors. Audit module 215 combines concurrently retrieved data from a plurality of analysis components. For example, audit module 215 may correlate an output from query/rules component 207 with an output from artificial intelligence engine 209. As another example, audit module 215 may utilize concurrently accessed data from query/rules component 207 and text mining component 211. Moreover, audit module 215 may utilize data that are sequentially accessed from a plurality of analysis components so that the output from one analysis component can be used to perform a deeper analysis with another analysis component. For example, audit module may utilize data accessed by query/rules component in which data records are accessed from source transaction system 201 to create a list of all members who are known to have duplicate or additional coverage, e.g., other primary coverage. Audit module 215 may subsequently instruct artificial intelligence engine 209 to use pattern recognition abilities to identify other members who have a higher likelihood than the average member of having other primary coverage. Consequently, advanced payment integrity system 200 may uncover more potentially erroneous payments to scrutinize and higher probability sets of data records to audit than would otherwise be the case if discovery module 205 were limited to using a single analytical technique or to performing analytical techniques without any interaction.

Recovery and adjustments module 217 is designed to track and process recoveries or additional payments. Recovery and adjustments module 217 may be integrated with the audit module to create efficiency in the process of resolving the results of audits. Results tracking module 219 provides reporting and tracking of the total payment integrity process.

Figure 3:
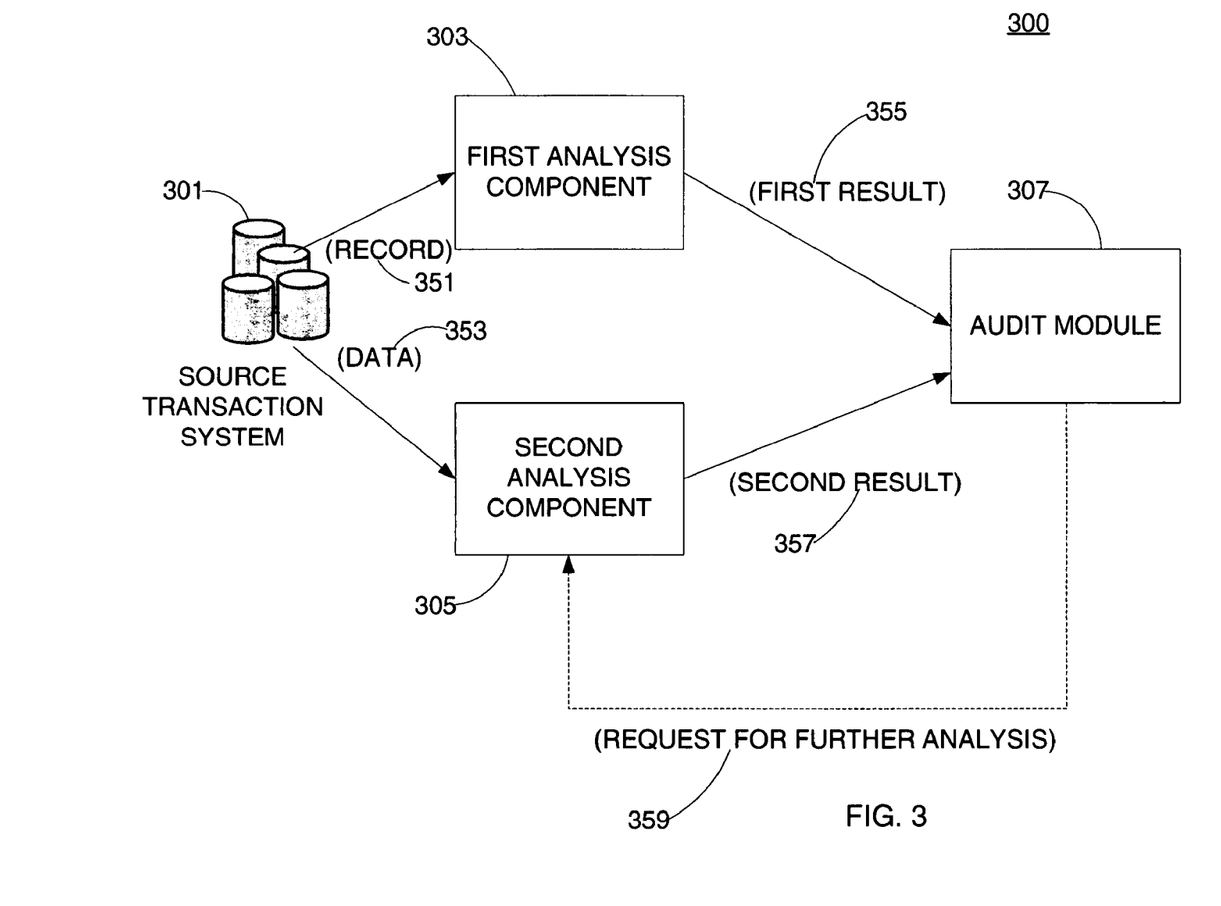
FIG. 3 illustrates interaction between an audit module and analysis components in accordance with an embodiment.

FIG. 3 illustrates architecture 300 providing interaction between audit module 307 and analysis components 303 and 305 in accordance with an embodiment. First analysis component 303 retrieves record 351 and second analysis component 305 retrieves data 353 from source transaction system 301. (In the embodiment, data 353 may be a data record or unstructured text data.) First analysis component 303 provides first result 355 and second analysis component 305 provides second result 357 to audit module 307. As previously discussed, audit module 307 may concurrently obtain first result 355 and second result 357. Audit module 307 may also obtain first result 355 and subsequently obtain second result 357 by subsequently requesting further analysis (by providing data criteria through interface 359) from second analysis component 305. The embodiment supports even deeper analysis by further invoking other analysis components (not shown) with additional data criteria that are derived from analysis components 303 and 305, in which analysis components may be chained together.

The embodiment also supports iteratively processing data from source transaction system 301 by first analysis component 303 and second analysis component 305. For example, audit module 307 may obtain first result 355 from first analysis component 303 by retrieving record 351. Audit module 307 subsequently instructs second analysis component 305 to provide second result 357 by retrieving data 353. Audit module 307 may further instruct first analysis component 303 to provide a third result (not shown) by retrieving another record (not shown). Audit module 307 may use the third result to audit a claim payment. Moreover, audit module 307 may iteratively continue the process (between first analysis component 303 and second analysis component 305) further instructing second analysis component 305 and so forth in order to converge on an optimized and maximized set of payments to review.

Figure 4:
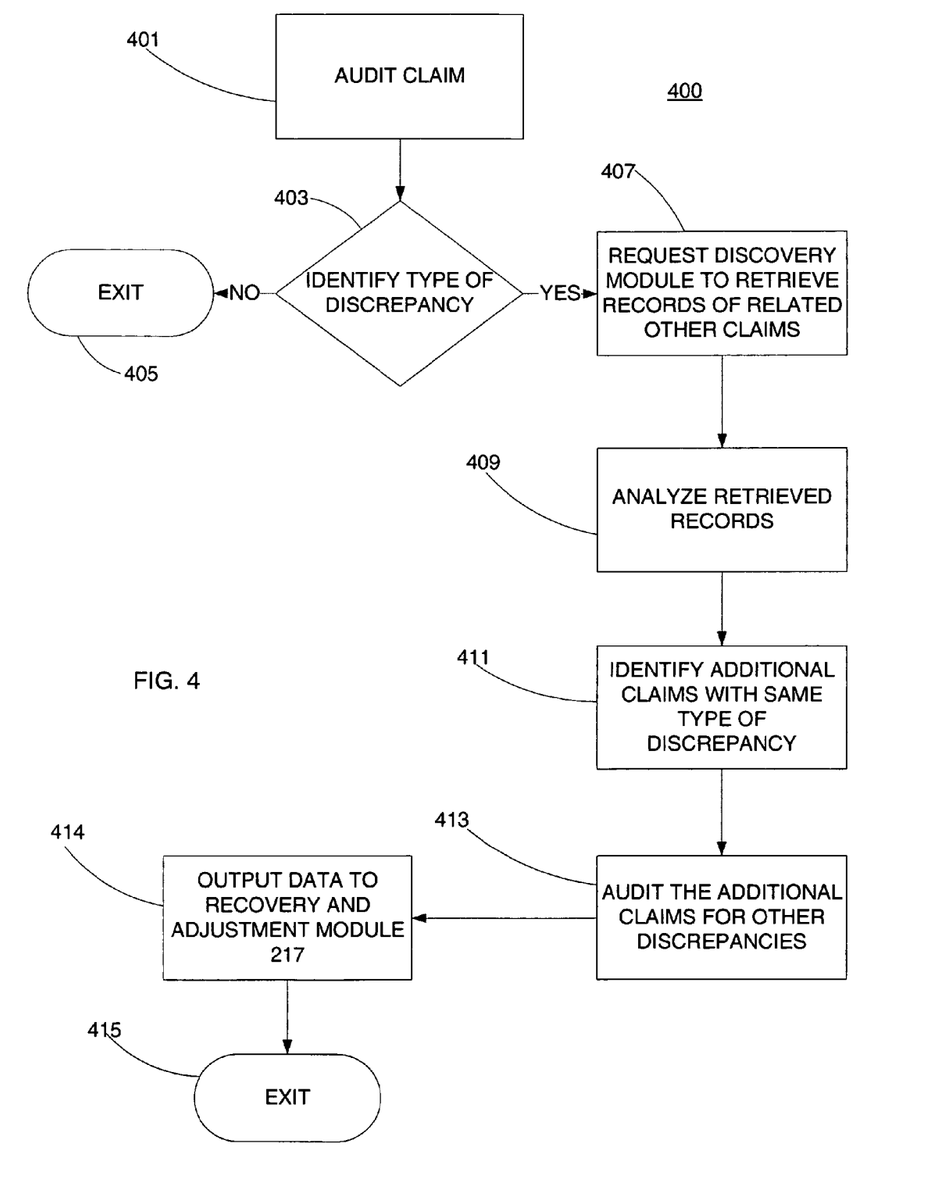
FIG. 4 shows a flow diagram for auditing claims in accordance with an embodiment.

FIG. 4 shows flow diagram 400 for auditing claims by audit module 215 (as shown in FIG. 2) in accordance with an embodiment. In step 401, audit module 215 receives a request to audit a claim payment. For example, audit module 215 may receive an e-mail request from a service provider or a processed data record that includes information regarding the disputed claim payment. (While process 400 may interact with an auditing specialist, process 400 may be fully or partially automated by audit module 215.) In step 403, audit module determines the discrepancy (error) associated with the claim payment. If audit module determines that there is no error, process 400 is terminated in step 405. Otherwise, in step 407 audit module 215 requests that discovery module 205 (e.g., artificial intelligence engine 209) retrieve records that are associated with other records that may have a similar error. Also, audit module 215 may request query/rule component 207, or text mining component 211, or other analytic methods previously referenced to retrieve other records. In step 409 audit module 215 analyzes the retrieved data records. In step 411, audit module 215 identifies claim payments that are associated with errors similar to the error identified in step 403. In step 413, audit module 215 audits the identified claim payments for other discrepancies. (Audit module 215 may fully or partially automate this task if established rules can be used or may interact with an auditing specialist.) Consequently, audit module 215 may provide an output to recovery and adjustments module 217 to adjust or recover payments (either underpayment or overpayment). In such a case, audit module 215 outputs data for identified claim payments to recovery and adjustment module 217 in step 414. Process 400 is terminated in step 415.

Figure 5:
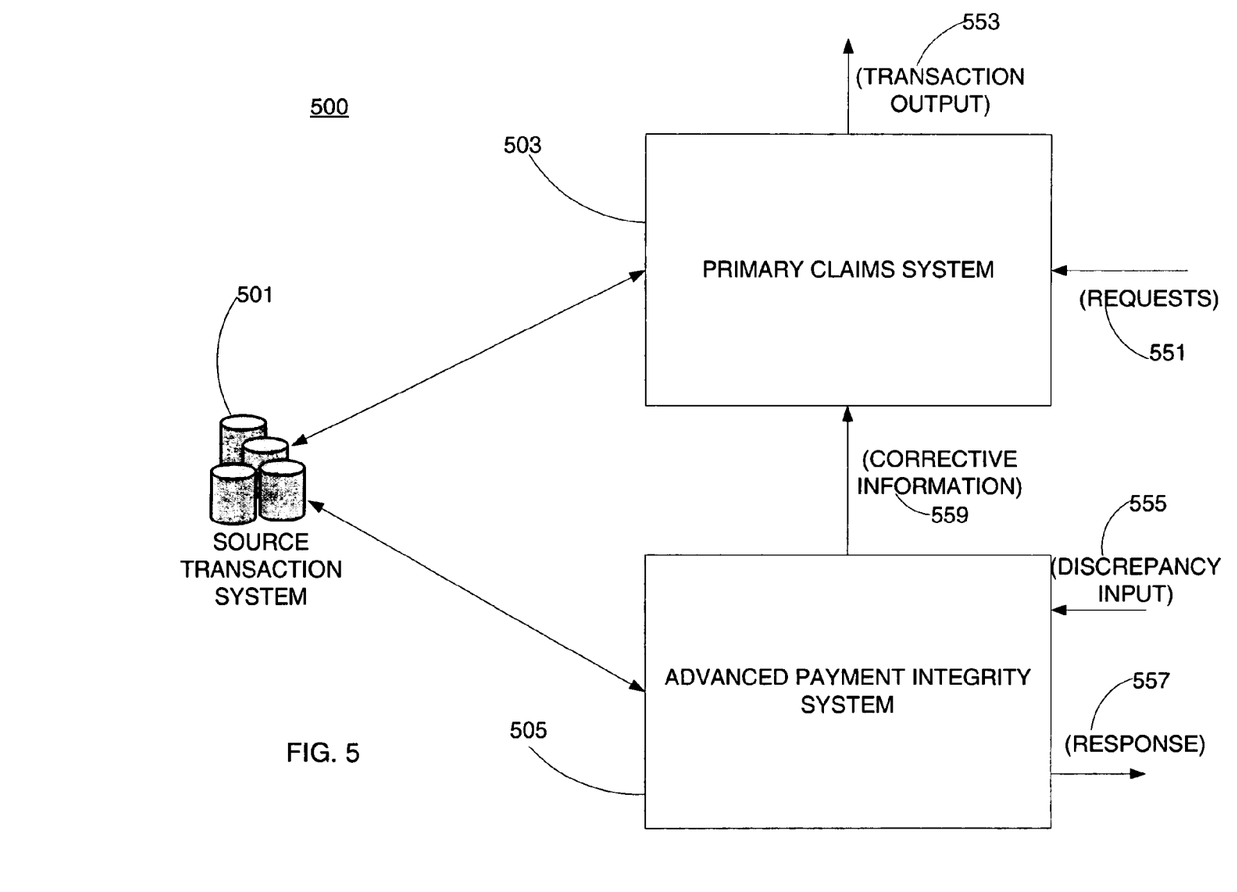
FIG. 5 shows an architecture of a claim transaction system in accordance with an embodiment

FIG. 5 shows an architecture of claim transaction system 500 in accordance with an embodiment. Claim transaction system 500 includes primary claims system 503 and advanced payment integrity system 505, which are interfaced to source transaction system 501. Primary claims system 503 functions as the main mechanism for processing claim payments, corresponding to payment requests 551 and transaction payments 553. Primary claims system 503 creates data (e.g., data records) that document claim payments and that are stored in source transaction system 501. (In an embodiment, source transaction system 501 may be implemented as a database layer of primary claims system 503.) As discussed previously, advanced payment integrity system 505 processes discrepancy input 555 relating to a claim payment that has been previously processed by primary claims system 553. Discrepancy input 555 may pertain to an overpayment or underpayment and may be generated by the payment integrity system either before or after payment. If advanced payment integrity system 505 uncovers a systematic error, advanced payment integrity system 505 may inform primary claims system 503 through corrective information interface 559 so that corrective action (which may comprise automatic feedback) may be taken for future transactions of claim payments. In response to the resolution of a claim discrepancy, advanced payment integrity system 505 generates a response, e.g., a letter requesting payment (corresponding to overpayment) or a check compensating a service provider (corresponding to underpayment). In the embodiment, response 557, which may be generated by recovery and adjustments module 217 as shown in FIG. 2, may be a letter requesting a repayment for an overpayment, a letter and check informing a member or a provider of a payment correction for an underpayment, an indicator to write off overpayment, or a request to a collection agency.

Figure 6:
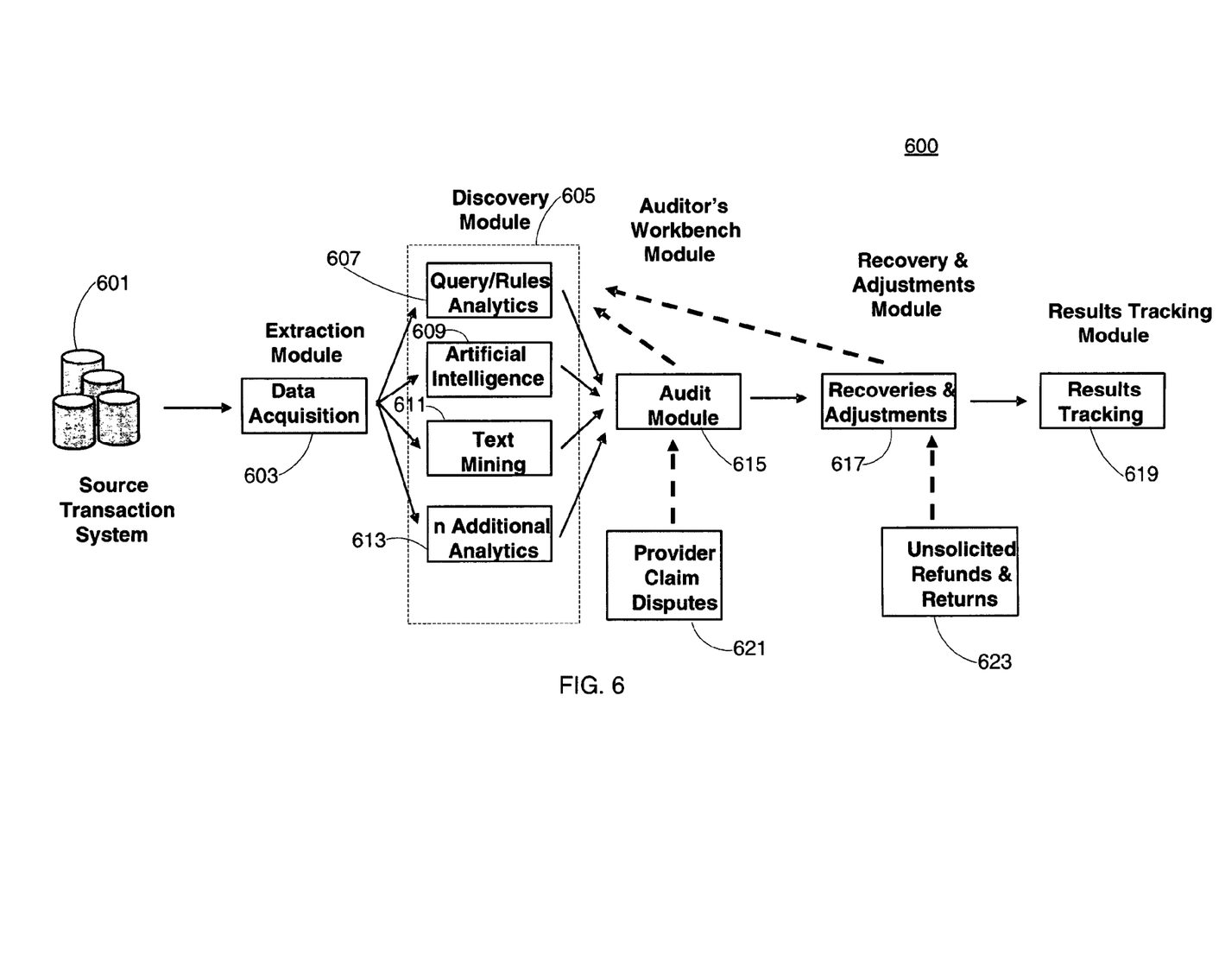
FIG. 6 shows an architecture of an advanced payment integrity system in accordance with an embodiment.

FIG. 6 shows an architecture of advanced payment integrity system 600 in accordance with an embodiment. Advanced payment integrity system 600 is similar to advanced payment integrity system 200 that is shown in FIG. 2. Advanced payment integrity system 600 comprises extraction module 603 that accesses data from source transaction system 601, discovery module 605, audit module 615, recovery and adjustments module 617, and results tracking module 619. Moreover, audit module 615 supports logging, reviewing, and processing provider disputes 621. Audit module 615 uses the outcome and instructs discovery module 605 to identify additional claims that may have a similar error. (As with discovery module 205 shown in FIG. 2, discovery module 605 includes query/rules component 607, artificial intelligence engine 609, text mining component 611, and another analytic component 613.) The additional claims may be further audited (either automatically by audit module 615 or by audit module 615 interacting with an auditing specialist) and corrected. Recovery and adjustments module 617 then processes any further action to make recoveries or adjustments on these additional claims.

Also, recovery and adjustment module 617 supports unsolicited refunds and returned payments 623. Recovery and adjustments module 617 may use the outcome of an unsolicited refund or returned payment to instruct discovery module 605. Discovery module 605 subsequently identifies additional claims that may have a similar error. The identified claims are further audited by audit module 615 and corrective action is taken as needed. For example, as with discovery module 205 shown in FIG. 2, discovery module 605 includes query/rules component 607, artificial intelligence engine 609, text mining component 611, and another analytic component 613. The additional claims may be further audited (either automatically by audit module 615 or by audit module 615 interacting with an auditing specialist) and corrected. Recovery and adjustments module 617 then processes any further action to make recoveries or adjustments on these additional claims.

Figure 7:
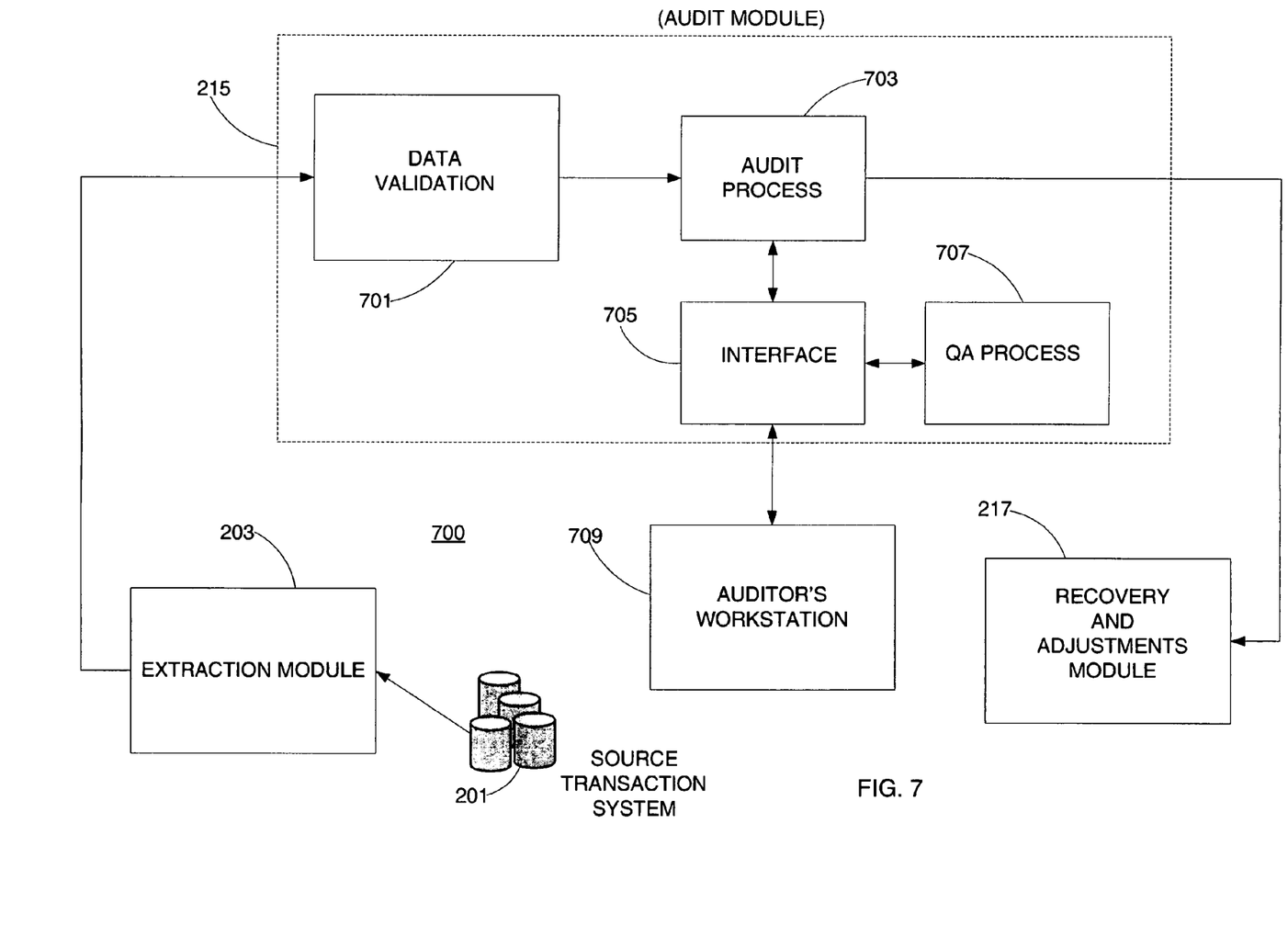
FIG. 7 shows an architecture with an audit module in accordance with an embodiment.

FIG. 7 shows architecture 700 with audit module 215 in accordance with an embodiment. As shown in FIG. 2, audit module 215 interfaces with extraction module 203 in order to access data in source transaction system 201 and interfaces with recovery and adjustments module 217. In the embodiment, an auditing supervisor (not shown) may instruct extraction module 203 to access data records from source transaction system 201 in order to import data for corresponding claim payments to audit module 215. Audit module 215 includes data validation component 701, audit process component 703, workstation interface 705, and QA process component 707. Data validation component 701 validates data retrieved from source transaction system 201. For example, data validation component 701 may verify that retrieved data records are for an active member or a registered service provider. Audit process component 703 may automatically audit a claim payment if the claim payment fits a set of established audit rules and or may otherwise interact with an auditing specialist (associated with workstation 709) through interface 705. Audit process component 703 may utilize QA (quality assurance) component 707 to interact with the auditing specialist and perform accuracy reviews of the results of audits. Quality assurance component 707 may ask the auditing specialist questions or may answer questions from the auditing specialist to provide quality assurance during the interaction. Audit process component 703 may include an expert system that utilizes rules (that may be based on the collective wisdom of expert auditing specialists). Audit module 215 may also determine a productivity measurement and/or quality measurement of an auditing specialist. The auditing specialist may enter an assigned work queue upon login. The auditing specialist is able to access all of the claims assigned to the auditing specialist. Also, audit module 215 may directly instruct the primary payment system or recovery and adjustments module 217 to recover or adjust the claims that audit module 215 discovers are erroneous and make additional payment or deduct overpayments from future claim payments.

Figure 8:
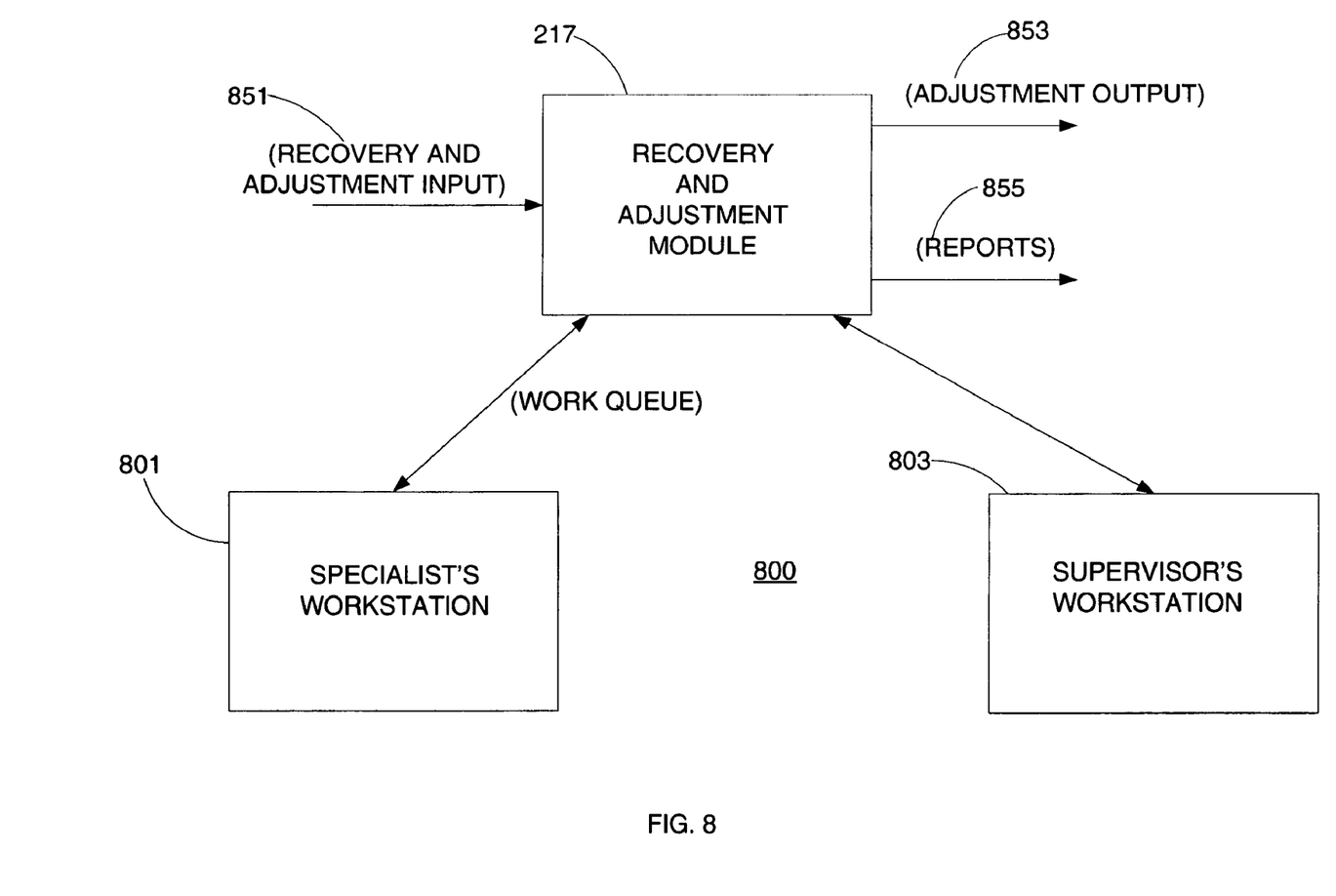
FIG. 8 shows an architecture with a recovery and adjustment module in accordance with an embodiment.

FIG. 8 shows architecture 800 with recovery and adjustment module 217 in accordance with an embodiment. Recovery and adjustment module 217 receives recovery and adjustment input 851 typically from an audit module (not shown) and provides adjustment output 853 and reports 855. Also, recovery and adjustment module 217 interfaces with specialist's workstation 801 and supervisor's workstation 803. In the embodiment, a supervisor (corresponding to supervisor's workstation 803) may assign recovery or adjustment requests to a specific specialist (corresponding to specialist's workstation 801) based on the specialist's current workload. Supervisors are able to import recovery or adjustment requests from outside sources (e.g., creating an EXCEL form for external units to complete and e-mail directly to the supervisor.) Also, the supervisor may assign return checks and refund checks to a specialist through a batching process. The supervisor may also unassign checks and recoveries to provide greater control over the workload of each specialist.

The specialist (corresponding to workstation 801) may enter the assigned work queue upon login. From workstation 801, the specialist is able to access all of the outstanding letters and checks assigned to the specialist. Upon entering a first letter queue, the specialist accesses all of the adjustments or recoveries assigned to the specialist that need to be either applied to balances, written off, sent to a vendor (e.g., a collection agency), or require the generation of an overpayment request or adjustment letter. Overpayment request letters are typically generated with a template using standard text based on the recovery or adjustment reason. The letter may also be customized to add additional facts and information.

The specialist may easily search for the original overpayment request. If there is a remaining balance after posting a check, the specialist may generate another overpayment request letter. If a service provider returns too much money, the specialist may return (or credit) the excess amount to the service provider.

Recovery and adjustment module 217 also supports an error queue (not shown) so that specialists may pend recoveries for the supervisor or external departments to review. Also, recovery and adjustment module 217 may generate a variety of reports 855 to ensure that accurate amounts for recovery and adjustments are reported to management.

Recovery and adjustment module 217, as previously discussed with FIG. 5, may directly instruct the primary payment system to recover or adjust the claims that recovery and adjustment module 217 processes and make additional payment or deduct overpayments from future claim payments.

As can be appreciated by one skilled in the art, a computer system with an associated computer-readable medium containing instructions for controlling the computer system may be utilized to implement the exemplary embodiments that are disclosed herein. The computer system may include at least one computer such as a microprocessor, a cluster of microprocessors, a mainframe, and networked workstations.

While the embodiments have been described with respect to specific examples including different modes of carrying them out, those skilled in the art will appreciate that there are numerous variations and permutations of the above described systems and techniques that fall within the spirit and scope of the appended claims, and their equivalents.

What is claimed is:

1. A data integrity system that processes data, including data associated with a biometric technology, the system comprising:

a discovery module to receive records from a source of data, which includes the data associated with the biometric technology, the discovery module comprising:

a query component, implemented by a processor, to query the source of data to identify a first subset of the records that satisfy a selection criterion and provide a first analysis output indicative of the first subset; and an artificial intelligence engine, implemented by the processor, to:

process the records to identify a second subset of the records having anomalous information, and provide a second analysis output indicative of the second subset;

an analysis module to:

receive and analyze the first analysis output, determine whether to instruct the artificial intelligence engine to analyze the records in accordance with the first analysis output, in response to determining to instruct the artificial intelligence engine to analyze the records in accordance with the first analysis output, instruct the artificial intelligence engine to analyze the records in accordance with the first analysis output, and facilitate resolution of a records analysis activity based on the first analysis output and the second analysis output.

2. The system of claim 1, wherein the data associated with the biometric technology is included with the records.

3. The system of claim 1, wherein the data associated with the biometric technology is included with the source of data.

4. The system of claim 1, wherein the biometric technology is associated with at least one of fingerprint information and iris image information.

5. The system of claim 4, wherein at least one of the fingerprint information and the iris image information verifies an identification.

6. The system of claim 4, wherein at least one of the fingerprint information and the iris image information is associated with an identification through registered characteristics.

7. The system of claim 1, wherein the records provide information that pertain to at least one transaction associated with an intent selected from a fraudulent intent, an unintentional error, and an abusive intent.

8. The system of claim 1, wherein either of the query component and the artificial intelligence engine includes an identification component which utilizes the data associated with a biometric technology to verify an identification.

9. A method comprising:
   querying, by a query component implemented by a processor, a data source, which includes data associated with a biometric technology, based on a selection criterion for records that provide information;
   identifying a first subset of the records that satisfy the selection criterion;
   generating, by the processor, a first analysis output indicative of the first subset;
   receiving the first analysis output by an analysis module;
   determining whether to instruct an artificial intelligence engine to analyze the records in accordance with the first analysis output;
   in response to determining to instruct the artificial intelligence engine to analyze the records in accordance with the first analysis output, instructing the artificial intelligence engine, by the analysis module, to analyze the records in accordance with the first analysis output;
   processing the records, by the artificial intelligence engine, to identify a second subset of the records having anomalous information;
   providing a second analysis output indicative of the second subset; and
   providing an analysis module output, by the analysis module, based on the first analysis output and the second analysis output.

10. The method of claim 9, wherein the data associated with the biometric technology is included with the records.

11. The method of claim 9, wherein the data associated with the biometric technology is included with the source of data.

12. The method of claim 9, wherein the biometric technology is associated with at least one of fingerprint information and iris image information.

13. The method of claim 12, wherein at least one of the fingerprint information and the iris image information verifies an identification.

14. The method of claim 12, wherein at least one of the fingerprint information and the iris image information is associated with an identification through registered characteristics.

15. The method of claim 9, wherein the records provide information that pertain to at least one transaction associated with an intent selected from a fraudulent intent, an unintentional error, and an abusive intent.

16. The method of claim 9, wherein either of the query component and the artificial intelligence engine includes an identification component utilizing the data associated with a biometric technology to verify an identification.

17. A non-transitory computer readable medium storing computer readable instructions that when executed by a computer system perform a method, the method comprising:
   querying, by a query component implemented by a processor, a data source, which includes data associated with a biometric technology, based on a selection criterion for records that provide information;
   identifying a first subset of the records that satisfy the selection criterion;
   generating, by the processor, a first analysis output indicative of the first subset;
   receiving the first analysis output by an analysis module;
   determining whether to instruct an artificial intelligence engine to analyze the records in accordance with the first analysis output;
   in response to determining to instruct the artificial intelligence engine to analyze the records in accordance with the first analysis output, instructing the artificial intelligence engine, by the analysis module, to analyze the records in accordance with the first analysis output;
   processing the records, by the artificial intelligence engine, to identify a second subset of the records having anomalous information;
   providing a second analysis output indicative of the second subset; and
   providing an analysis module output, by the analysis module, based on the first analysis output and the second analysis output.

18. The computer readable medium of claim 17, wherein the data associated with the biometric technology is included with the records.

19. The computer readable medium of claim 17, wherein the data associated with the biometric technology is included with the source of data.

20. The computer readable medium of claim 17, wherein the biometric technology is associated with at least one of fingerprint information and iris image information.

* * * * *